(12) United States Patent
Kumar et al.

(10) Patent No.: US 12,709,336 B2
(45) Date of Patent: Aug. 18, 2026

(54) AIR-GAP AERODYNAMICALLY SEALING APPARATUS FOR A MOTORIZED VEHICLE, AND MOTORIZED VEHICLE, IN PARTICULAR A TRUCK, COMPRISING SUCH AN APPARATUS

(71) Applicant: Volvo Truck Corporation, Gothenburg (SE)

(72) Inventors: Akarsh Kumar, Telangana (IN); Muthukumar Venkitachalam, Thiruvananthapuram (IN); Johan Torsholm, Gothenburg (SE)

(73) Assignee: Volvo Truck Corporation, Gothenburg (SE)

( * ) Notice: Subject to any disclaimer, the term of this patent is extended or adjusted under 35 U.S.C. 154(b) by 336 days.

(21) Appl. No.: 18/398,338

(22) Filed: Dec. 28, 2023

(65) Prior Publication Data

US 2024/0217595 A1 Jul. 4, 2024

(30) Foreign Application Priority Data

Jan. 4, 2023 (EP) .................................... 23150345

(51) Int. Cl.
*B62D 35/00* (2006.01)
*B60R 3/00* (2006.01)

(52) U.S. Cl.
CPC ............ *B62D 35/001* (2013.01); *B60R 3/002* (2013.01)

(58) Field of Classification Search
CPC .............................. B62D 35/001; B60R 3/002
See application file for complete search history.

(56) References Cited

U.S. PATENT DOCUMENTS 4,357,045 A * 11/1982 Kinford, Jr. ......... B62D 35/001 296/180.2
4,375,342 A * 3/1983 Wollar ................ F16B 19/1081 411/41

(Continued)

FOREIGN PATENT DOCUMENTS

CN 111891220 A 11/2020
DE 1020534 B 12/1957

(Continued)

OTHER PUBLICATIONS

European Search Report for European Patent Application No. 23150345.9, completed Jun. 14, 2023, 2 pages.

*Primary Examiner* — Aaron L Lembo
(74) *Attorney, Agent, or Firm* — Withrow & Terranova, PLLC

(57) ABSTRACT

An apparatus for aerodynamically sealing at least part of an air gap formed between at least a first part and a second part of a motorized vehicle, comprising a sealing device having a shaped body comprising a connecting portion which is suitable to be connected, to the first part of the motorized vehicle or to an additional part which is connected to the first part of the motorized vehicle; an air-gap sealing portion which protrudes from the first portion and is suitable to aerodynamically seal, at least partially, the air gap; and at least one mechanical connector which is suitable to connect the connecting portion of the sealing device to the first part of the motorized vehicle or to the additional part connected to the first part of the motorized vehicle in a releasable, tamper-proof, manner.

15 Claims, 6 Drawing Sheets

(56) References Cited

U.S. PATENT DOCUMENTS

| | | | | |
|---|---|---|---|---|
| 4,627,657 | A * | 12/1986 | Daniels | B60J 1/2005<br>180/68.6 |
| 4,836,568 | A * | 6/1989 | Preslik | B60R 11/06<br>296/180.1 |
| 4,957,325 | A * | 9/1990 | Engel | B62D 35/001<br>296/180.2 |
| 4,991,906 | A * | 2/1991 | Fingerle | B62D 33/0612<br>296/180.2 |
| 5,595,416 | A * | 1/1997 | Horwill | B62D 35/005<br>24/535 |
| 5,836,640 | A * | 11/1998 | Hurayt | B62D 29/048<br>296/180.2 |
| 7,163,258 | B2 * | 1/2007 | Dyer, II | B62D 25/24<br>296/180.1 |
| 8,899,659 | B2 * | 12/2014 | Angelo | B62D 35/001<br>296/180.2 |
| 10,081,302 | B1 | 9/2018 | Frederick et al. | |
| 10,711,737 | B2 * | 7/2020 | Reedy | F02M 25/089 |
| 11,628,893 | B2 * | 4/2023 | Boesche | B62D 35/007<br>296/180.1 |
| 2016/0280168 | A1 | 9/2016 | Klop et al. | |

FOREIGN PATENT DOCUMENTS

| | | | | |
|---|---|---|---|---|
| DE | 4341693 | A1 | 7/1994 | |
| DE | 10000006 | A1 | 7/2001 | |
| DE | 10000006 | C2 * | 9/2003 | B62D 35/00 |
| DE | 102016011627 | A1 | 4/2017 | |
| DE | 102017113942 | A1 | 12/2018 | |
| SE | 501861 | C2 * | 6/1995 | B62D 33/067 |

* cited by examiner 20
22
17
16
10
14
12
15
100
30
3

AIR-GAP AERODYNAMICALLY SEALING APPARATUS FOR A MOTORIZED VEHICLE, AND MOTORIZED VEHICLE, IN PARTICULAR A TRUCK, COMPRISING SUCH AN APPARATUS

PRIORITY APPLICATIONS

The present application claims priority to European Patent Application No. 23150345.9, filed on Jan. 4, 2023, and entitled "AIR-GAP AERODYNAMICALLY SEALING APPARATUS FOR A MOTORIZED VEHICLE, AND MOTORIZED VEHICLE, IN PARTICULAR A TRUCK, COMPRISING SUCH AN APPARATUS," which is incorporated herein by reference in its entirety.

TECHNICAL FIELD

The disclosure relates generally to the field of motorized vehicles, and in particular to aerodynamic efficiency of motorized vehicles.

In particular aspects, the disclosure relates to an apparatus for aerodynamically sealing at least part of an air gap formed between at least two parts part of a motorized vehicle, and to a motorized vehicle, in particular a truck, comprising such an apparatus.

The disclosure will be described hereinafter by making particular reference to a truck, and more in particular to a front part of a truck, without intending in any way to restrict its possible application, and it can be applied in principle to any type of motorized vehicles, be them cars, buses, heavy-duty construction vehicles, et cetera.

BACKGROUND

Motor vehicles may have, for example on their external body, some parts between which an air gap is formed. These air gaps constitute the entry gate for undesired air seepage, and thus may negatively influence the aerodynamic efficiency of the vehicle. Also the overall aesthetic impression of the vehicle may be negatively impacted by such air gaps, since internal parts may become too visible.

For example, trucks have, at their front, a step and a front panel or frame. The step is movable between an open position, where the step is spaced from the front panel, and a closed position where the step is positioned close to the front panel but anyhow an unavoidable gap is formed, at least between some sections of facing edges of the step and of the panel.

The present disclosure is aimed at providing a solution capable of at least partially mitigating at least part of such issues.

SUMMARY

According to a first aspect of the disclosure, there is provided an apparatus for aerodynamically sealing at least part of an air gap formed between at least a first part and a second part of a motorized vehicle, the apparatus comprising:

- a sealing device having a shaped body comprising:
  - (a) a connecting portion which is suitable to be connected, to said first part of the motorized vehicle or to an additional part which is connected to said first part of the motorized vehicle; and
  - (b) an air-gap sealing portion which protrudes from the first portion and is suitable to aerodynamically seal, at least partially, said air gap;
- at least one mechanical connector which is suitable to connect the connecting portion of the sealing device to said first part of the motorized vehicle (1) or to said additional part connected to the first part of the motorized vehicle in a releasable, tamper-proof, manner.

The first aspect of the disclosure may seek to at least limit, if not completely preventing, airflows to penetrate inside the vehicle where not desired. In this way, aerodynamic efficiency may be improved. Further, once installed, the apparatus or part(s) thereof cannot be easily tampered, while at the same time the apparatus itself or part(s) thereof can be easily removed, for example for due maintenance and/or replacement.

In some aspects, the apparatus further comprises a mounting structure which is suitable to be connected to the first part of the motorized vehicle, and wherein said at least one mechanical connector connects the connecting portion of the sealing device to said mounting structure. A technical benefit may include easily adapting the apparatus to different first and second parts where it has to be installed.

In one possible aspect, said at least one mechanical connector comprises a plurality of mechanical connectors.

In particular, in one possible aspect the or each mechanical connector comprises a plastic rivet having an axially movable plunger.

According to such aspects, the apparatus can be installed according to a simple and not expensive solution.

In one possible aspect, the air-gap sealing portion comprises at least two adjacent sections which form a predefined angle $\alpha$ between them. According to this example, incoming airflow can be properly stopped and deviated.

In one possible aspect, the air-gap sealing portion comprises at least one edge part which is suitable to overlap with an associated portion of said second part of the motorized vehicle. Accordingly, at least partial closure of the air gap may be further improved.

According to a second aspect of the disclosure, there is provided a motorized vehicle comprising at least one apparatus for aerodynamically sealing at least part of an air gap formed between at least two parts of the vehicle itself, as above defined, and in particular as described hereinafter and defined in the relevant appended claims.

According to a further aspect of the disclosure, there is provided a truck comprising:

- a first part and a second part, wherein an air gap is formed between said first and second parts; and
- at last one apparatus for aerodynamically sealing at least part of said air gap, the apparatus comprising:
- a sealing device having a shaped body comprising:
  - a connecting portion which is suitable to be connected, to said first part or to an additional part connected to said first part; and
  - an air-gap sealing portion which protrudes from the first portion and is suitable to aerodynamically seal, at least partially, said air gap when the sealing device is connected, directly or indirectly, to said first part;
- at least one mechanical connector which is suitable to connect the connecting portion of the sealing device to said first part or to said additional part connected to the first part in a releasable, tamper-proof, manner.

According to these second and third aspects, the apparatus can be used for at least partially sealing any air gap formed between two parts of a motorized vehicle, and in particular of a truck.

In some examples of the truck, the apparatus further comprises a mounting structure which is suitable to be connected to said first part of the motorized vehicle, and wherein said at least one mechanical connector connects the connecting portion of the sealing device (10) to said mounting structure.

In one further possible aspect, the first part is a substantially fixed part of the truck, and the second part is a part of the truck movable, with respect to the fixed part, between a first position, where the second part is spaced apart from the first fixed part, and a second position, where the second movable part is positioned close to and forms said air gap with said first fixed part. According to this aspect, the apparatus may be conveniently used to for at least partially sealing the air gap between two parts of a truck having relative large motion.

In one possible aspect, the substantially first fixed part of the truck comprises or is constituted by a front panel of the truck, and the second movable part comprises or is constituted by the step of the truck.

According to these aspects, the apparatus may be conveniently used to for at least partially sealing the air gap between two parts of a truck having relative large motion, such as between the step and the front panel.

In one aspect of the truck, the at least one mechanical connector comprises a plurality of mechanical connectors.

In particular, the or each mechanical connector comprises a plastic rivet having an axially movable plunger.

In yet a further possible aspect of the truck, the air-gap sealing portion comprises at least two adjacent sections which form a predefined angle ($\alpha$) between them.

In a possible further aspect of the truck, the air-gap sealing portion comprises at least one edge part which is suitable to overlap with an associated portion of said second part of the truck.

The above aspects, accompanying claims, and/or examples disclosed herein above and later below may be suitably combined with each other as would be apparent to anyone of ordinary skill in the art.

Additional features and advantages are disclosed in the following description, claims, and drawings, and in part will be readily apparent therefrom to those skilled in the art or recognized by practicing the disclosure as described herein.

BRIEF DESCRIPTION OF THE DRAWINGS

With reference to the appended drawings, below follows a more detailed description of aspects of the disclosure cited as examples.

DETAILED DESCRIPTION

Figure 1:
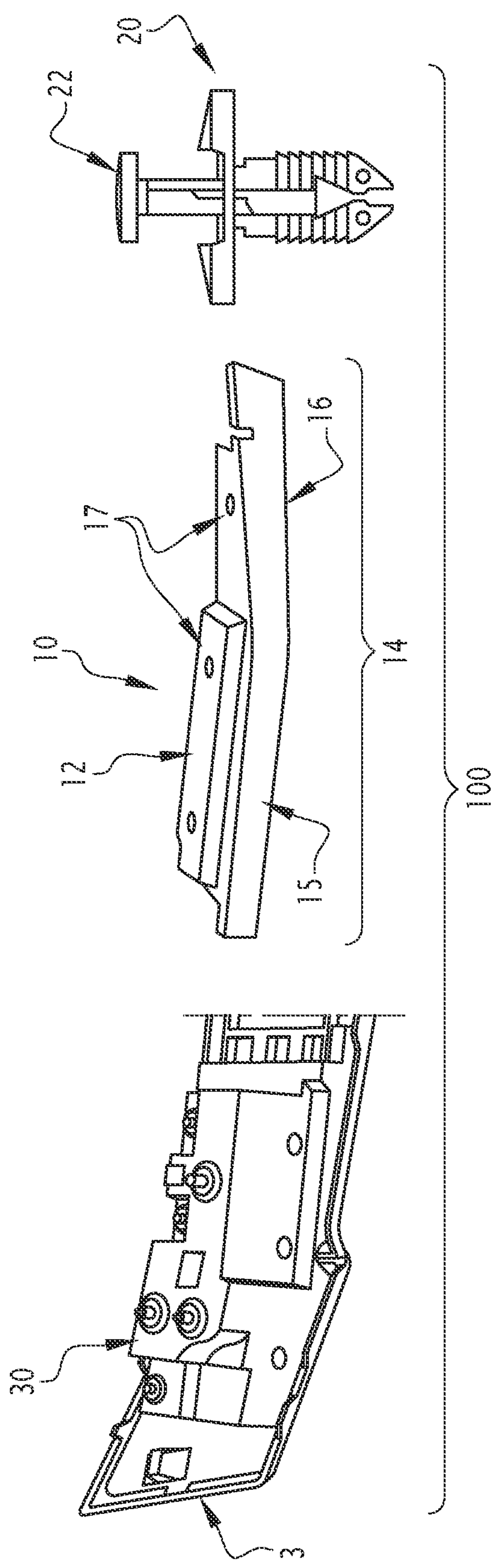
FIG. 1 is an exploded view schematically showing the components of an apparatus for aerodynamically sealing at least part of an air gap formed between at least a first part and a second part of a motorized vehicle according to one example.
Figure 1:
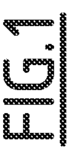

Aspects set forth below represent the necessary information to enable those skilled in the art to practice the disclosure.

It should be noted that in the detailed description that follows, identical or similar components, either from a structural and/or functional point of view, have the same reference numerals, regardless of whether they are shown in different embodiments of the present disclosure; it should also be noted that in order to clearly and concisely describe the present disclosure, the drawings may not necessarily be to scale and certain features of the disclosure may be shown in somewhat schematic form.

Further, when the term “adapted” or “arranged” or “configured” or “shaped”, is used herein while referring to any component as a whole, or to any part of a component, or to a combination of components, it has to be understood that it means and encompasses correspondingly either the structure, and/or configuration and/or form and/or positioning of the related component or part thereof, or combinations, such term refers to.

The presence of air gaps between parts of motorized vehicles, e.g. at the external body thereof, such as the air gaps formed between large parts having relative motion in front parts of trucks, constitute a kind of rat holes through which airflow can penetrate and may generate aerodynamic disturbances. Further, such air gaps may negatively impact the overall aesthetic appearance of the vehicle since internal parts may become visible. In addition, such undesired penetrating airflow may impact on the cooling efficiency as well. According to the disclosure, the adoption of an apparatus for aerodynamically sealing at least part of such air gaps, as it will be described in more details hereinafter, allows mitigating, if not completely preventing, the negative effects of undesired air seepage. Further, the overall aesthetic impression of the vehicle may be improved. Moreover, any negative impact on cooling of the undesired air seepage via such air gaps may be prevented, thus possibly improving cooling efficiency.

FIG. 1 illustrates an exemplary apparatus 100 for aerodynamically sealing at least part of an air gap formed between two parts of a motorized vehicle, such as two parts of the car body of the vehicle itself, wherein the components of the apparatus 100 according to this example are shown disassembled in FIG. 1.

Figure 2:
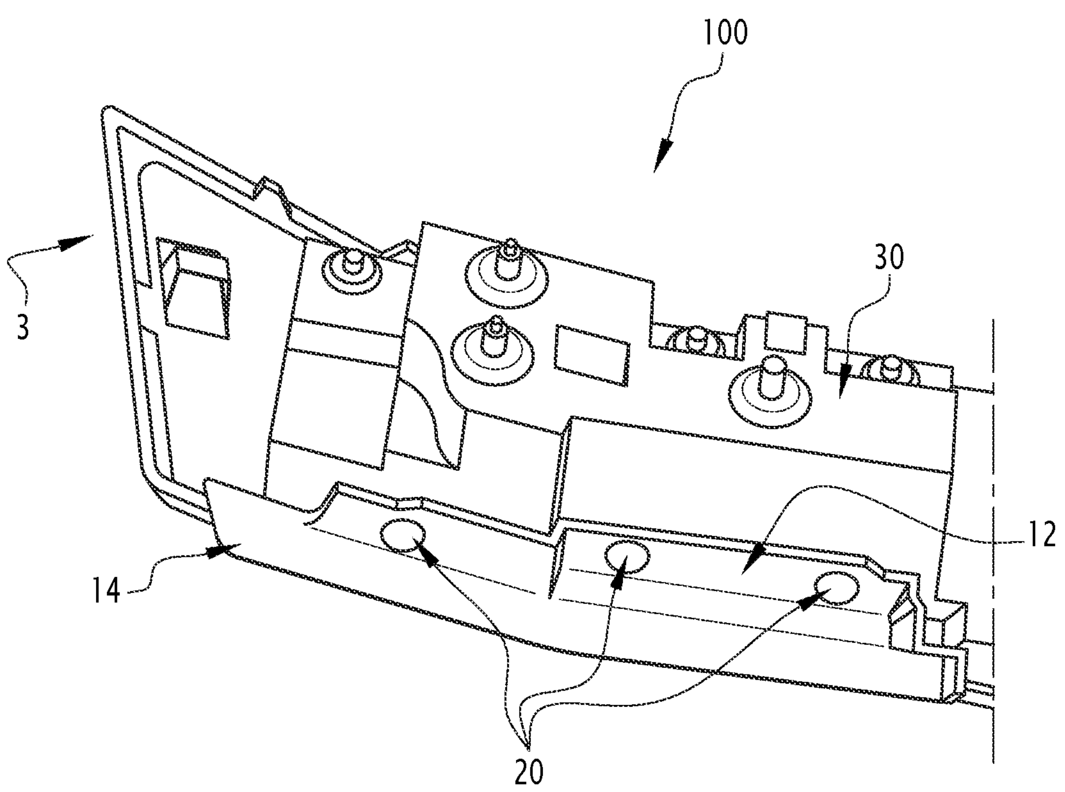
FIG. 2 shows the components of the apparatus of FIG. 1 assembled and connected to a part of a truck, seen from a rear view.
Figure 3:
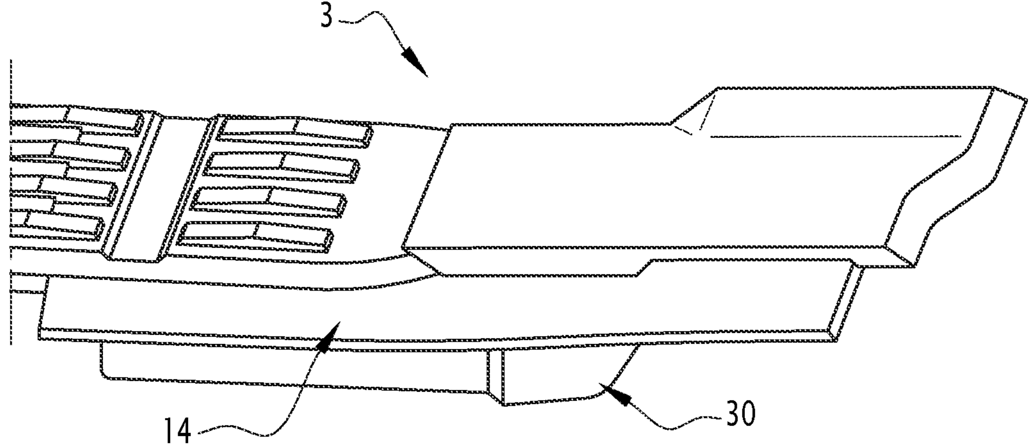
FIG. 3 is an enlarged view of the circled area A of FIG. 4.

FIG. 2 illustrates the components of the apparatus 100 shown in FIG. 1 assembled together and seen from a rear view, and wherein the apparatus 100 as a whole is shown is connected to a part 3 of a vehicle, e.g. any suitable part of the car body of a motorized vehicle.

The motorized vehicle can be any suitable motorized vehicle.

Figure 4:
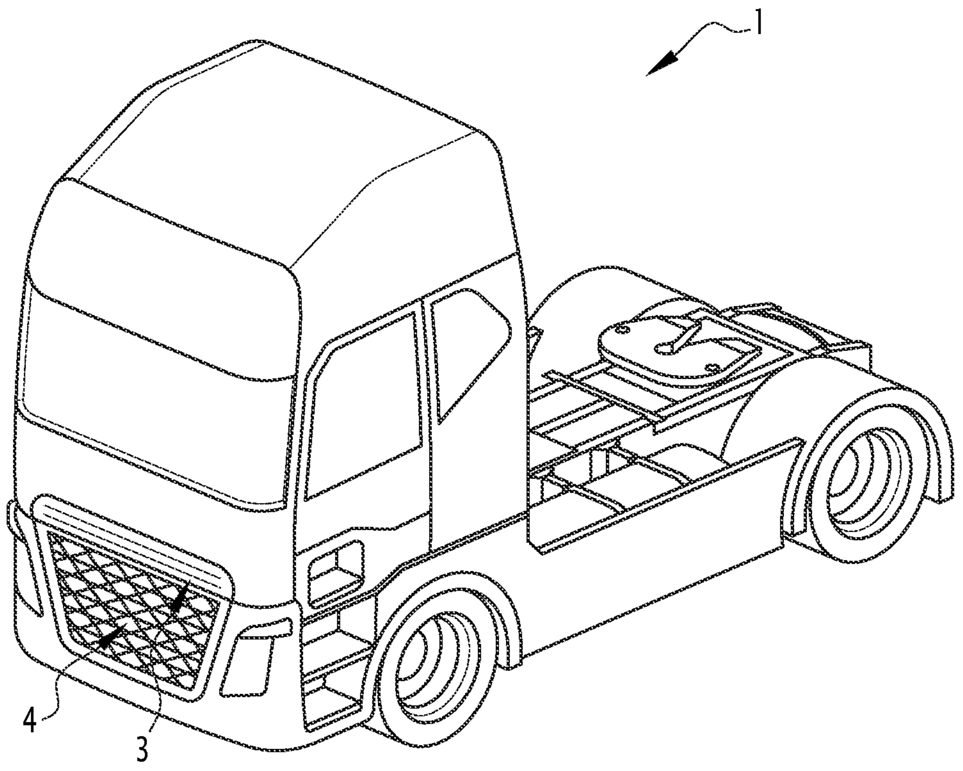
FIG. 4 shows an exemplary truck, in the form of a semi-trailer tractor.

As a possible example of a motorized vehicle to which the apparatus 100 according to the disclosure can be applied to, in FIG. 4 there is illustrated a truck 1 in the form of a semi-trailer tractor.

The truck 1 comprises for example, at its lower front, a front panel 3 which is a substantially fixed part, and a step 4.

Figure 5:
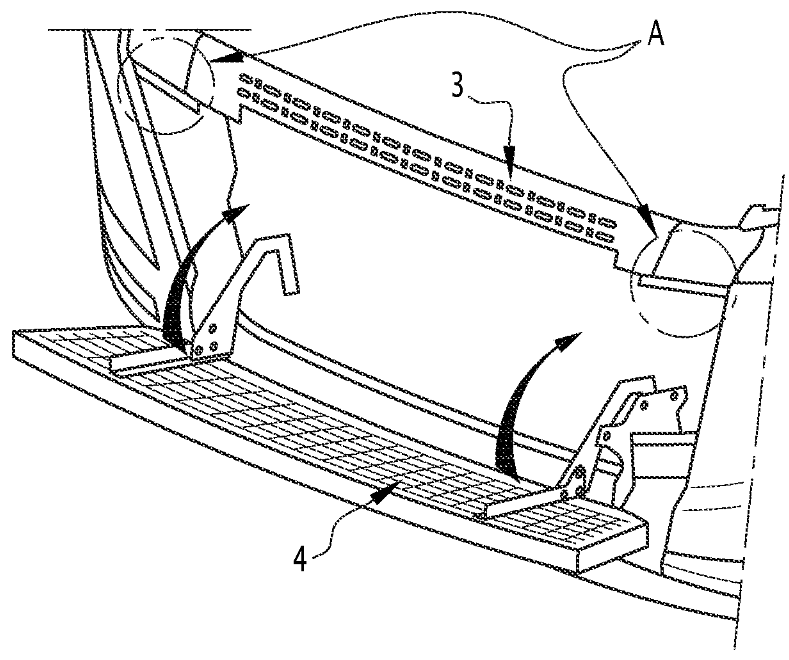
FIG. 5 is a perspective view showing the lower front of a truck, wherein the step of the truck is in an open position with respect to the front panel, and the apparatus of FIG. 1 is attached at both end parts of the front panel.
Figure 6:
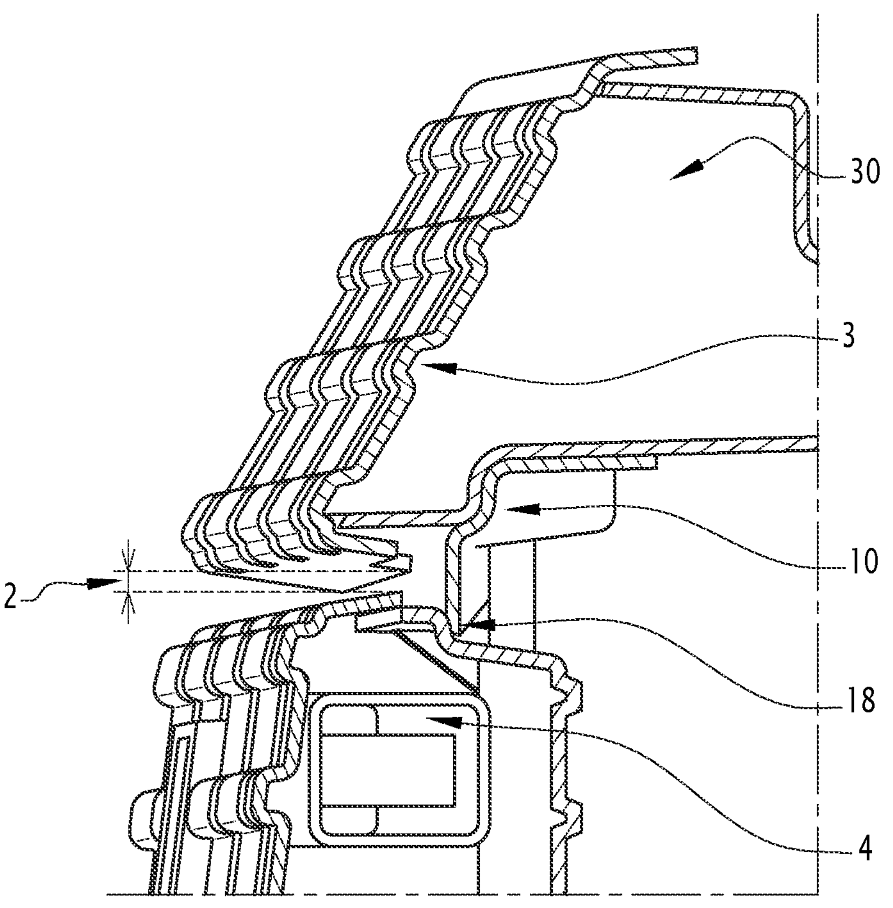
FIG. 6 is a side view showing part of the lower front of the truck illustrated in FIG. 4, wherein the step is in a closed position.

The step 4 is movable relative to the front panel 3 between a first position, illustrated in FIG. 5, where the step 4 is spaced apart from the front panel 3, and a second position, illustrated in FIG. 4 and in FIG. 6, where the step 4 is close to and forms an air gap with the front panel 3.

The air gap formed in such position between the front panel 3 and the step 4, which is the position regularly assumed when the truck 1 is travelling, is illustrated in FIG. 6 by the reference number 2.

Clearly, as it will appear more clearly from the following description, the apparatus 100 according to the disclosure can be used for aerodynamically sealing any air gap 2 formed by at least two adjacent parts of any motorized vehicle, e.g. two parts of the external car body or frame; depending on the applications, the two parts can be both fixed, both movable, one movable relative to the other, as it happens for the step 4 relative to the front panel 3, there could be even more than two parts, etc.

Hence, in the following description, the illustrated front panel 3 and the step 4 will be used as an example of any two parts of a motorized vehicle 1 between which an air gap can be formed, such as the illustrated air gap 2.

The apparatus 100 comprises a sealing device, indicated in FIG. 1 by the reference number 10, which has a shaped body comprising a connecting portion 12 and an air gap sealing portion 14.

The connection portion 12 is suitable to be connected to the first part 3 of the motorized vehicle 1, such as the front panel 3 of the truck 1.

In particular, as described in more details hereinafter, depending on the applications, e.g. the shape and positioning of the two parts 3 and 4 forming an air gap there between, the connecting portion 12 can be connected to the first part 3 directly or indirectly, namely via an additional part connected in its turn to the first part 3.

The apparatus 100 comprises also at least one mechanical connector, indicated in FIG. 1 with reference number 20, which is suitable to connect the connecting portion 12 of the sealing device 10 directly to the first part 3, e.g. the front panel 3 of the truck 1, or to said additional part connected to the first part 3.

Conveniently, the at least one mechanical connector 20 is configured to connect the connecting portion 12 of the sealing device 10 directly to the front part 3 or to an additional part which is in turn connected to the front part 3, in a releasable, tamper-proof, manner.

In one possible example, at least one mechanical connector 20 comprises a plurality of mechanical connectors 20.

According to a possible example, the or each mechanical connector 20 comprises a plastic rivet having an axially movable plunger 22.

When the sealing device 10 is connected, via its connecting portion 12, directly or indirectly to the front panel 3, the air-gap sealing portion 14 protrudes from the first portion 12 and is suitable to aerodynamically close, at least partially, the air gap 2.

In one possible embodiment, as illustrated in the example of FIG. 1, the apparatus 100 further comprises a mounting structure, indicated in FIG. 1 with the reference number 30, which is suitable to be connected to the first part 3, and thus constitutes in this case the above mentioned additional part.

In such a case, as illustrated in FIG. 2, the mounting structure is connected to a portion of the front panel 3, with the sealing device 10, in particular its connecting portion 12, by means of at least one mechanical connector 20, preferably by a plurality of mechanical connectors 20, for example three as illustrated in FIG. 2.

The mounting structure 30 can be realized in one or more pieces, for example made of any suitable plastics material; further, depending on the applications, and in particular on the type, shape and position of the pieces forming the air gap to be aerodynamically sealed, as well as the space available for mounting the apparatus 100, the body of the mounting structure 30 can be different from the one depicted in the exemplary figures.

Alternatively, depending on the applications, the additional part can be another part of the motorized vehicle connected to the first part 3.

According to yet another possible example, the sealing device 10 can be connected directly to the first part 3, such as the front panel 3, by means of one or more mechanical connectors 20; hence, in this case, the apparatus 100 comprises the sealing device 10 and the one or more mechanical connectors 20.

In one possible example, the shaped body of the sealing device 10 may be realized in one piece.

According to a possible embodiment, the sealing device 10 may be realized of any suitable rubber material.

In one possible embodiment, as for example illustrated in FIG. 1, the air-gap sealing portion 14 comprises at least two adjacent sections 15 and 16 which form a predefined angle $\alpha$ between them.

According to a further possible example, the air-gap sealing portion 14 comprises at least one edge part 18, e.g. that formed along the lower border of the adjacent sections 15 and 16, which is suitable to overlap with an associated portion of the second part 4 of the motorized vehicle 1, e.g. the front panel 4 of the truck 1, when the sealing device 10 is connected, directly or indirectly, to the first part 3.

For example, as schematically illustrated in the exemplary configuration of FIG. 5, two apparatuses 100 according to the disclosure can be installed at both ends of the front panel 3.

When each apparatus 100 is installed, the plunger of the or of each plastic rivet 20 is pressed axially inside the body of the respective rivet 20 inserted via the holes 17. Thus, the sealing device 10 is releasably fixed to the mounting structure 30, which in turn is connected to the front panel 3. In such position, the or each rivet 20 cannot be removed easily unless using a proper tool.

Then, for example when the movable step 4 is moved from the open position illustrated in FIG. 5 to the closed position illustrated in FIG. 6, the sealing device 10, and in particular its air-gap sealing portion 14, is placed inside and thus materially fills, at least partially, the air gap 2.

In particular, the two adjacent sections 15 and 16 form a kind of aerodynamic material barrier that at least partially closes the air gap 2 and hinders airflows to pass through.

Thanks to the predefined angle $\alpha$ formed between the two sections 15 and 16, incoming airflows are diverted away towards the side part of the front of the truck 1.

Hence, it has been seen that the apparatus 100 according to the disclosures allows acts as an aerodynamic seal or air gap filler which hinder airflow to pass through air gaps, and direct such airflows away, for example in the driving condition of a motor vehicle.

In particular, the installation of the apparatus is realized by means of one or more anti-tamper connectors, which cannot be removed easily by mistake or by somebody just fooling with a vehicle.

In this way, it is possible to obtain an improved aerodynamic efficiency, with a consequent positive impact on fuel efficiency.

Also, the aesthetic overall impression of a vehicle may be ameliorated.

These results are obtained with a solution easy to be realized, assembled and in case serviced. Indeed, when necessary, it is possible to properly remove any part of the apparatus 100 to be replaced, e.g. to release the sealing device 10 from the mounting structure 30, and replace it with a new one. Alternatively, the apparatus 100 as a whole may be easily replaced as well. In particular, when the mounting structure 30 is used, it may be also connected to the first part 3 with one or more mechanical connectors 20, or similar connectors, thus realizing also in this case a releasable, tamper-proof connection.

The apparatus 100 can be installed in principle in any type of motorized vehicle, be it already in use or a new one. Hence, an aspect of the present disclosure concerns also a motorized vehicle comprises at least one apparatus 100 as previously described, and in particular as defined in the appended claims.

The terminology used herein is for the purpose of describing particular aspects only and is not intended to be limiting of the disclosure. As used herein, the singular forms "a," "an," and "the" are intended to include the plural forms as well, unless the context clearly indicates otherwise. As used herein, the term "and/or" includes any and all combinations of one or more of the associated listed items. It will be further understood that the terms "comprises," "comprising," "includes," and/or "including" when used herein specify the presence of stated features, integers, steps, operations, elements, and/or components, but do not preclude the presence or addition of one or more other features, integers, steps, operations, elements, components, and/or groups thereof.

It will be understood that, although the terms first, second, etc., may be used herein to describe various elements, these elements should not be limited by these terms. These terms are only used to distinguish one element from another. For example, a first element could be termed a second element, and, similarly, a second element could be termed a first element without departing from the scope of the present disclosure.

Relative terms such as "below" or "above" or "upper" or "lower" or "horizontal" or "vertical" may be used herein to describe a relationship of one element to another element as illustrated in the Figures. It will be understood that these terms and those discussed above are intended to encompass different orientations of the device in addition to the orientation depicted in the Figures. It will be understood that when an element is referred to as being "connected" or "coupled" to another element, it can be directly connected or coupled to the other element, or intervening elements may be present. In contrast, when an element is referred to as being "directly connected" or "directly coupled" to another element, there are no intervening elements present.

Unless otherwise defined, all terms (including technical and scientific terms) used herein have the same meaning as commonly understood by one of ordinary skill in the art to which this disclosure belongs. It will be further understood that terms used herein should be interpreted as having a meaning consistent with their meaning in the context of this specification and the relevant art and will not be interpreted in an idealized or overly formal sense unless expressly so defined herein.

It is to be understood that the present disclosure is not limited to the aspects described above and illustrated in the drawings; rather, the skilled person will recognize that many changes and modifications may be made within the scope of the present disclosure and appended claims. In the drawings and specification, there have been disclosed aspects for purposes of illustration only and not for purposes of limitation, the scope of the inventive concepts being set forth in the following claims.

The invention claimed is:

1. An apparatus for aerodynamically sealing at least a portion of an air gap between at least a first front panel and a second front panel of a motorized vehicle, the apparatus comprising:
- a sealing device having a shaped body comprising:
  - a connecting portion which is suitable to be connected to an interior of the first front panel of the motorized vehicle; and
  - an air-gap sealing portion which integrally protrudes from the first-connecting portion and is configured, when the connecting portion is connected to the interior of the first front panel, to extend downward from the interior of the first front panel across the air gap to contact the second front panel to aerodynamically seal at least a portion of partially, the air gap; and
- at least one mechanical connector which is suitable to connect the connecting portion of the sealing device to the interior of the first front panel of the motorized vehicle in a releasable, tamper-proof manner.

2. The apparatus of claim 1, further comprising a mounting structure which is suitable to be connected to the first front panel of the motorized vehicle, and wherein the at least one mechanical connector connects the connecting portion of the sealing device to the mounting structure.

3. The apparatus of claim 1, wherein the at least one mechanical connector comprises a plurality of mechanical connectors.

4. The apparatus of claim 1, wherein the at least one mechanical connector comprises a plastic rivet having an axially movable plunger.

5. The apparatus of claim 1, wherein the air-gap sealing portion comprises at least two adjacent sections which form a predefined angle between them.

6. The apparatus of claim 1, wherein the air-gap sealing portion comprises at least one edge part which is suitable to overlap with an associated portion of the second front panel of the motorized vehicle.

7. A motorized vehicle comprising the apparatus of claim 1.

8. A truck comprising:
- a first front panel and a second front panel, wherein an air gap is formed between the first front panel and the second front panel; and
- at least one apparatus for aerodynamically sealing at least part-a portion of the air gap, the apparatus comprising:
  - a sealing device having a shaped body comprising:
    - a connecting portion which is suitable to be connected to an interior of the first front panel; and
    - an air-gap sealing portion which integrally protrudes from the connecting portion and is suitable to aerodynamically seal at least a portion of the air gap when the sealing device is connected to the interior of the first front panel by extending downward from the interior of the first front panel across the air gap to contact the second front panel; and
  - at least one mechanical connector which is suitable to connect the connecting portion of the sealing device to the first front panel in a releasable, tamper-proof manner.

9. The truck of claim 8, wherein the apparatus further comprises a mounting structure which is suitable to be connected to the first front panel of the motorized vehicle, and wherein the at least one mechanical connector connects the connecting portion of the sealing device to the mounting structure.

10. The truck of claim 8, wherein the first front panel is a substantially fixed part, and the second front panel is a movable part, with respect to the first front panel, between a first position, where the second front panel is spaced apart from the first front panel, and a second position, where the second front panel is positioned close to and forms the air gap with the first front panel.

11. The truck of claim 10, wherein the substantially first fixed part comprises or is constituted by the first front panel of the truck and the second front panel comprises or is constituted by a step of the truck.

12. The truck of claim 8, wherein the at least one mechanical connector comprises a plurality of mechanical connectors.

13. The truck of claim 8, wherein the at least one mechanical connector comprises a plastic rivet having an axially movable plunger.

14. The truck of claim 8, wherein the air-gap sealing portion comprises at least two adjacent sections which form a predefined angle between them.

15. The truck of claim 8, wherein the air-gap sealing portion comprises at least one edge part which is suitable to overlap with an associated portion of the second front panel of the truck.

* * * * *